United States Patent
Branson et al.

(10) Patent No.: US 10,684,886 B2
(45) Date of Patent: *Jun. 16, 2020

(54) GENERATING DIFFERENCES FOR TUPLE ATTRIBUTES

(71) Applicant: International Business Machines Corporation, Armonk, NY (US)

(72) Inventors: Michael J. Branson, Rochester, MN (US); James E. Carey, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 346 days.

This patent is subject to a terminal disclaimer.

(21) Appl. No.: 15/797,131

(22) Filed: Oct. 30, 2017

(65) Prior Publication Data

US 2018/0046499 A1 Feb. 15, 2018

Related U.S. Application Data

(63) Continuation of application No. 15/131,361, filed on Apr. 18, 2016, now Pat. No. 9,898,332, which is a
(Continued)

(51) Int. Cl.
*G06F 9/48* (2006.01)
*G06F 16/2455* (2019.01)
(Continued)

(52) U.S. Cl.
CPC .............. *G06F 9/4843* (2013.01); *G06F 9/46* (2013.01); *G06F 16/24568* (2019.01); *G06F 16/90* (2019.01)

(58) Field of Classification Search
CPC .. G06F 9/4843; G06F 16/24568; G06F 16/90; G06F 9/46
(Continued)

(56) References Cited

U.S. PATENT DOCUMENTS 4,868,570 A * 9/1989 Davis ...................... H03M 7/42
341/106
5,530,939 A * 6/1996 Mansfield, Jr. ......... G06F 16/28
(Continued)

OTHER PUBLICATIONS

Arasu et al., "Stream: The Stanford Stream Data Manager", Article DOI:10.1145/872757.872854, Jan. 2003, pp. 1-4. (Year: 2003).*
(Continued)

*Primary Examiner* — Phuong Thao Cao
(74) *Attorney, Agent, or Firm* — Stosch Sabo

(57) ABSTRACT

A sequence of tuples, each having one or more attributes, is received at one of one or more processing elements operating on one or more processors. Each processing element may have one or more stream operators. A first stream operator may be identified as one that only processes an instance of a first attribute in a currently received tuple when a difference between an instance of the first attribute in a previously received tuple and the instance of the first attribute in the currently received tuple is outside of a difference threshold. A second stream operator may generate a difference attribute from a first instance of the first attribute in a first one of the received tuples and a second instance of the first attribute in a second one of the received tuples. The difference attribute may be transmitted from the second stream operator to the first stream operator.

20 Claims, 9 Drawing Sheets

Related U.S. Application Data continuation of application No. 13/919,378, filed on Jun. 17, 2013, now Pat. No. 9,384,302.

(51) Int. Cl.
  *G06F 9/46* (2006.01)
  *G06F 16/90* (2019.01)
(58) Field of Classification Search
  USPC .......................................................... 707/625
  See application file for complete search history.

(56) References Cited

U.S. PATENT DOCUMENTS

| | | | |
|---|---|---|---|
| 5,745,645 A | 4/1998 | Nakamura et al. | |
| 6,148,308 A | 11/2000 | Neubauer et al. | |
| 6,339,772 B1 | 1/2002 | Klein et al. | |
| 6,389,168 B2* | 5/2002 | Altunbasak | G06K 9/00711 |
| | | | 382/224 |
| 6,526,416 B1 | 2/2003 | Long | |
| 6,665,342 B1 | 12/2003 | Brown et al. | |
| 7,613,848 B2 | 11/2009 | Amini et al. | |
| 7,644,110 B2 | 1/2010 | Nishizawa et al. | |
| 7,827,299 B2 | 11/2010 | Cadarette et al. | |
| 8,095,690 B2 | 1/2012 | Kashiyama et al. | |
| 8,560,526 B2 | 10/2013 | Santosuosso et al. | |
| 8,560,527 B2 | 10/2013 | Santosuosso et al. | |
| 8,577,902 B1 | 11/2013 | Ye et al. | |
| 8,683,074 B2 | 3/2014 | Meek et al. | |
| 8,904,149 B2 | 12/2014 | Eren et al. | |
| 9,213,743 B2 | 12/2015 | Yang et al. | |
| 9,348,940 B2 | 5/2016 | Branson et al. | |
| 9,384,302 B2 | 7/2016 | Branson et al. | |
| 2002/0122566 A1 | 9/2002 | Keating et al. | |
| 2003/0093789 A1* | 5/2003 | Zimmerman | H04H 20/59 |
| | | | 725/34 |
| 2003/0130855 A1 | 7/2003 | Babu et al. | |
| 2003/0174878 A1* | 9/2003 | Levin | G01N 21/95607 |
| | | | 382/149 |
| 2004/0169874 A1 | 9/2004 | Tone | |
| 2005/0053046 A1 | 3/2005 | Wang | |
| 2006/0059510 A1 | 3/2006 | Huang et al. | |
| 2006/0139678 A1 | 6/2006 | Klopsch et al. | |
| 2007/0044128 A1 | 2/2007 | Witt | |
| 2007/0053660 A1 | 3/2007 | Abe et al. | |
| 2007/0239718 A1 | 10/2007 | Baxter et al. | |
| 2007/0240161 A1 | 10/2007 | Prabhakar et al. | |
| 2007/0245028 A1 | 10/2007 | Baxter et al. | |
| 2008/0259876 A1 | 10/2008 | Qiang et al. | |
| 2009/0164496 A1 | 6/2009 | Carnathan et al. | |
| 2009/0271529 A1 | 10/2009 | Kashiyama et al. | |
| 2009/0281971 A1 | 11/2009 | Aggarwal et al. | |
| 2010/0030896 A1 | 2/2010 | Chandramouli et al. | |
| 2010/0125553 A1 | 5/2010 | Huang et al. | |
| 2010/0228750 A1 | 9/2010 | Solin | |
| 2010/0229178 A1 | 9/2010 | Ito | |
| 2010/0235335 A1 | 9/2010 | Heman et al. | |
| 2010/0287204 A1 | 11/2010 | Amini et al. | |
| 2010/0293532 A1 | 11/2010 | Andrade et al. | |
| 2011/0016469 A1 | 1/2011 | Klein | |
| 2011/0029554 A1 | 2/2011 | Ito et al. | |
| 2011/0239048 A1 | 9/2011 | Andrade et al. | |
| 2012/0066184 A1* | 3/2012 | Barsness | G06F 16/24568 |
| | | | 707/687 |
| 2012/0096046 A1 | 4/2012 | Kucera | |
| 2012/0110042 A1 | 5/2012 | Barsness et al. | |
| 2012/0150877 A1 | 6/2012 | Ramamurthy et al. | |
| 2012/0158360 A1 | 6/2012 | Cammert et al. | |
| 2012/0218268 A1 | 8/2012 | Accola et al. | |
| 2013/0073592 A1 | 3/2013 | Kannan et al. | |
| 2013/0106655 A1* | 5/2013 | Pujante Cuadrupani | ................... |
| | | | G01S 19/33 |
| | | | 342/357.73 |
| 2013/0145203 A1 | 6/2013 | Fawcett | |
| 2013/0151522 A1 | 6/2013 | Aggarwal et al. | |
| 2013/0290969 A1* | 10/2013 | Branson | G06F 9/48 |
| | | | 718/102 |
| 2014/0040915 A1 | 2/2014 | Chen et al. | |
| 2014/0089929 A1 | 3/2014 | Branson et al. | |
| 2014/0095506 A1 | 4/2014 | Branson et al. | |
| 2014/0156707 A1 | 6/2014 | Sax et al. | |
| 2014/0164601 A1 | 6/2014 | Branson et al. | |
| 2014/0172887 A1 | 6/2014 | Yang et al. | |
| 2014/0195930 A1 | 7/2014 | Rajagopal et al. | |
| 2014/0304545 A1 | 10/2014 | Chen et al. | |
| 2014/0304549 A1 | 10/2014 | Hsu et al. | |
| 2014/0372431 A1 | 12/2014 | Branson et al. | |
| 2014/0373019 A1 | 12/2014 | Branson et al. | |
| 2014/0379711 A1* | 12/2014 | Branson | G06F 13/10 |
| | | | 707/736 |
| 2015/0149507 A1 | 5/2015 | Imaki et al. | |
| 2016/0034581 A1 | 2/2016 | Doan | |
| 2017/0102965 A1 | 4/2017 | Branson et al. | |
| 2017/0366633 A1 | 12/2017 | Dozier et al. | |

OTHER PUBLICATIONS

Ballard et al., "IBM InfoSphere Streams: Harnessing Data in Motion", Sep. 2010, 360 pages, IBM Redbooks http://www.redbooks.ibm.com/abstracts/sg247865.html.

IBM, "IBM Streams Processing Language Standard Toolkit Reference," IBM InfoSphere Streams Version 2.0.0.4., © Copyright IBM Corp. 2011, 2012, 78 pages http://publib.boulder.ibm.com/infocenter/streams/v2r0/topic/com.ibm.swg.im.infosphere.streams.product.doc/doc/IBMInfoSphereStreams-SPLStandardToolkitReference.pdf.

Wei, M., "Multi-Mode Stream Processing for Hopping Window Queries," Master Thesis submitted to Worcester Polytechnic Institute, May 2008, 61 pages http://www.wpi.edu/Pubs/ETD/Available/etd-050608-150639/unrestricted/Master_thesis_template.pdf.

Ives, "Adaptive Stream Processing," Encyclopedia of Database Systems, 5 pages, Springer US, 2009.

Jacques-Silva, et al., "Modeling Stream Processing Applications for Dependability Evaluation," Proceedings of the 2011 IEEE/IFIP 41st International Conference on Dependable Systems and Networks (DSN), pp. 430-441, 2011.

Pauw, et al., "Visual Debugging for Stream Processing Applications," G. Rosu et al. (Eds.): RV 2010, LNCAS 6418, pp. 18-35, 2010, Springer-Verlag Berlin Heidelberg.

Lee, et al., "Attribute-Based Evaluation of Multiple Continuous Queries for Filtering Incoming Tuples of a Data Stream," ScienceDirect, Information Sciences 178 (2008), pp. 2416-2432, 2008, Elsevier.

Cherniack, et al., "Scalable Distributed Stream Processing," Proceedings of the 2003 CIDR Conference, 2003, 12 pages.

Carney, et al., "Monitoring Streams—A New Class of Data Management Applications," Proceedings of the 28th VLDB Conference, Hong Kong, China, 2002, 12 pages.

Branson et al., "Generating Differences for Tuple Attributes", U.S. Appl. No. 15/797,142, filed Oct. 30, 2017.

\* cited by examiner

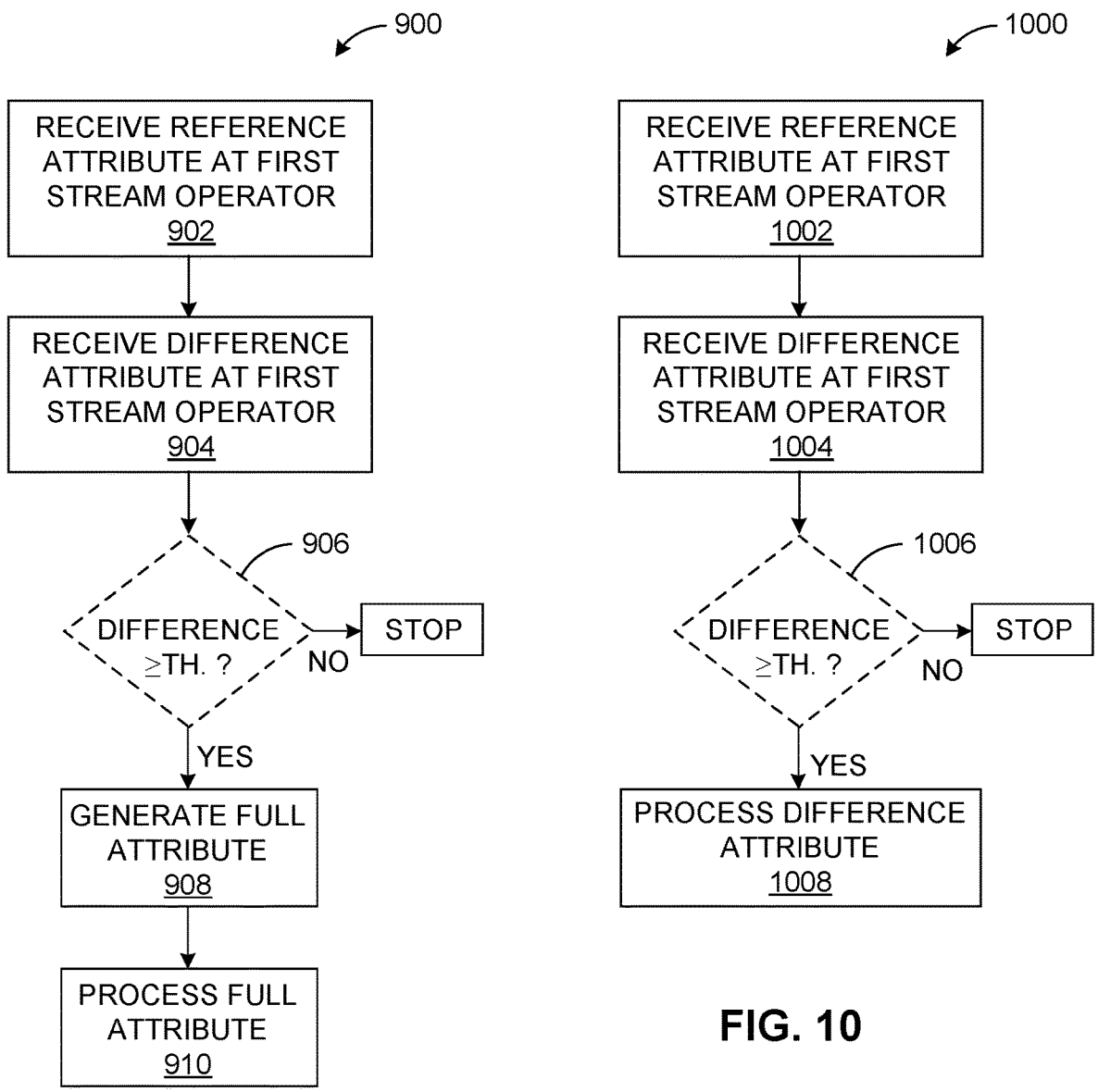

GENERATING DIFFERENCES FOR TUPLE ATTRIBUTES

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method and system for processing tuples. The method and system are directed to processing tuples on one or more computer processors. Each tuple may have one or more attributes.

In an embodiment, a method includes receiving at one of one or more processing elements a sequence of two or more tuples to be processed by the processing elements. Each processing element may have one or more stream operators. In addition, the method may include identifying that a first stream operator only processes an instance of a first attribute in a currently received tuple when a difference between an instance of the first attribute in a previously received tuple and the instance of the first attribute in the currently received tuple is outside of a difference threshold. The method may also include generating, at a second stream operator, a difference attribute from a first instance of the first attribute in a first one of the received tuples and a second instance of the first attribute in a second one of the received tuples. Further, the method may include transmitting the difference attribute from the second stream operator to the first stream operator.

In an embodiment, a method includes receiving at one of one or more processing elements a sequence of two or more tuples to be processed by the processing elements. Each processing element may have one or more stream operators. In addition, the method may include identifying that a first stream operator only processes an instance of a first attribute in a currently received tuple when a difference between an instance of the first attribute in a previously received tuple and the instance of the first attribute in the currently received tuple is outside of a difference threshold. The method may also include generating, at a second stream operator, a difference attribute from a first instance of the first attribute in a first one of the received tuples and a second instance of the first attribute in a second one of the received tuples. Further, the method may include determining whether the difference attribute is outside of the difference threshold and transmitting the difference attribute from the second stream operator to the first stream operator when the difference attribute is outside of the difference threshold.

BRIEF DESCRIPTION OF THE DRAWINGS

FIG. 9 illustrates a method for receiving difference tuple attributes in a stream computing application according to various embodiments.

FIG. 10 illustrates an alternative method for receiving tuple difference attributes in a stream computing application according to various embodiments.

Like reference numbers and designations in the various drawings indicate like elements.

DETAILED DESCRIPTION

Figure 1:
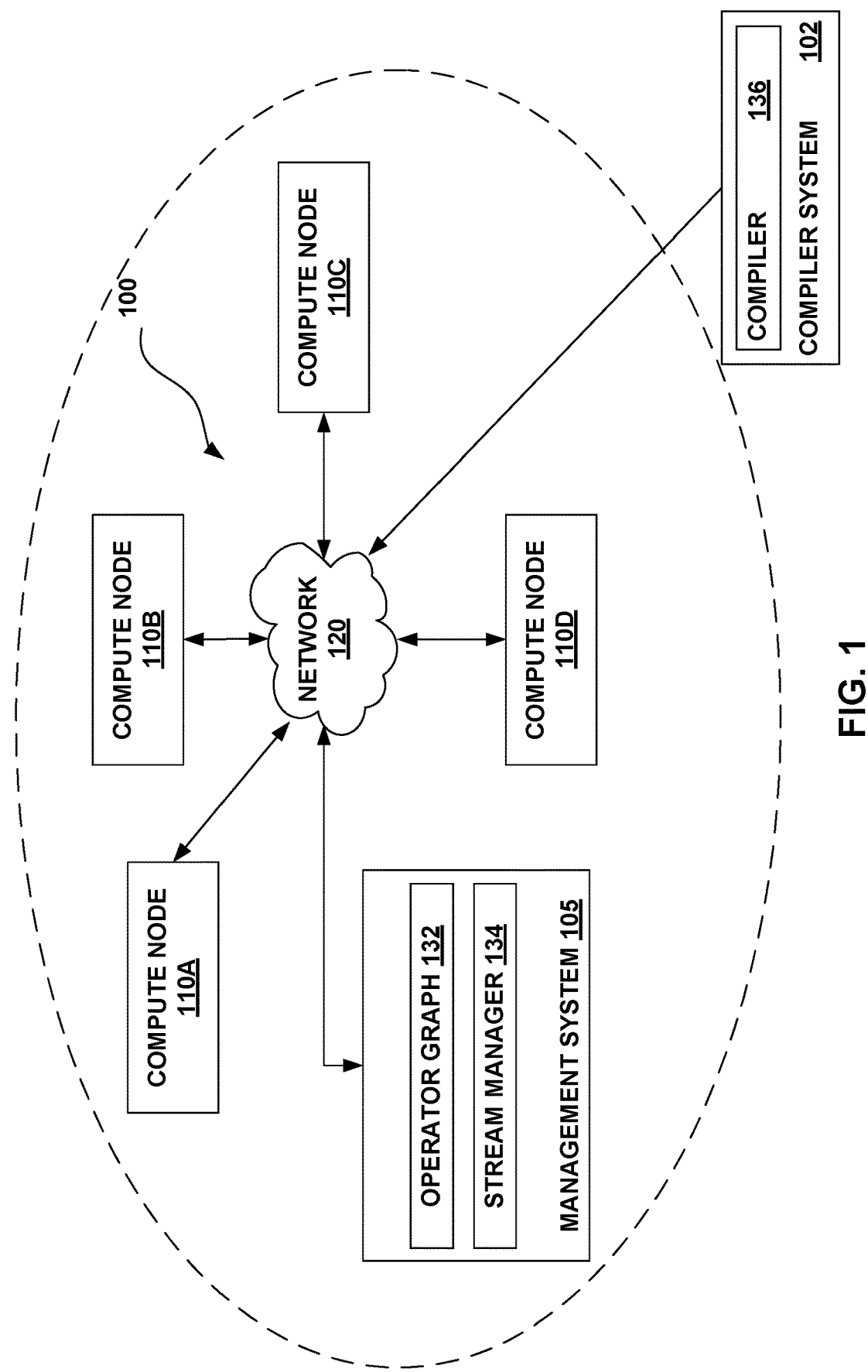
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). An application is distributed across nodes by creating executables, which may be referred to as "processing elements." Scalability is achieved by replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In various embodiments, a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. An attribute may be a file, e.g., image or audio data. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. When a stream operator receives a tuple, it may perform operations, such as analysis logic, which can change the tuple by adding or subtracting attributes, or updating the values of existing attributes within the tuple. A stream operator may perform operations on fewer than all of the attributes of a tuple it receives. In some applications, a stream operator may perform operations on an attribute only if the particular instance of the attribute has changed from an instance of the attribute in a previously received tuple. When the analysis logic is done, a new tuple is then sent to the next stream operator. An input tuple corresponding with a particular entity that is received by a stream operator or processing element, however, is generally not considered to be the same tuple that is output by the stream operator or processing element, even when the output tuple corresponds with the same entity or data as the input tuple. It is not required, however, that an output tuple be changed in some way from the input tuple.

Nonetheless, an output tuple may be changed in some way by a stream operator or processing element. An attribute or metadata may be added, deleted, or changed. For example, a tuple will often have two or more attributes. A stream operator or processing element may receive the tuple having multiple attributes and output a new tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. Because an output tuple may be considered a different tuple from a corresponding input tuple, a parent-child scheme may be useful for tracking tuple flow in an operator graph. In an exemplary scheme, any tuple may be designated a parent tuple. For example, a tuple entering an operator graph or a tuple output by a source operator may be designated as a parent tuple. Generally, when a parent tuple is received by a stream operator or processing element, the output corresponding with the input tuple may be designated a child of the parent. The child tuple may in turn be input to another stream operator or processing element. The output from the second stream operator or processing element corresponding with the input child tuple may also be designated a child of the parent, as further described below. In addition, as mentioned, any tuple may be designated a parent tuple. Accordingly, a tuple that is a child of a parent tuple may itself be designated a parent tuple.

While a parent-child scheme may be useful for tracking tuple flow in an operator graph in some contexts, in other contexts it may be simpler to refer to both an input tuple and a corresponding output tuple as the same tuple.

In stream computing applications, the stream operators and processing elements of an operator graph may be distributed across multiple compute nodes as well as within individual compute nodes. Processing elements and stream operators in distinct processing elements may be connected by inter-process communication paths. An "inter-process communication path," as used herein, may refer to operations that use a network and employ an internet socket, such as a TCP/IP socket, a stream socket, a datagram socket, or any other similar operation. An inter-process communication path, as used herein, may also refer to operations that employ a shared memory segment, a pipe, a named pipe (also known as a FIFO), a message queue, a memory mapped file, a UNIX domain or inter-process communication socket, or any other similar operation.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. Various embodiments described in this document may conserve the available bandwidth on one or more inter-process communication paths. Efficient use of inter-process communication bandwidth can speed up processing.

The data ingested by some stream computing applications may not change for a period of time, or may change slowly or by a small degree over time. In some applications, a particular attribute of a tuple may remain constant for a period of time or may only change in small increments. As one example, an attribute of a tuple may be an image file generated by an image sensor in a stationary camera trained on a scene. The scene may be of an infrequently visited area. The camera may capture and transmit 30 frames per second. A tuple may contain an image attribute captured at an initial time. If the changes in the scene are small or nonexistent for five seconds, the image attributes of 150 successive tuples would change little or remain constant.

According to various embodiments, certain stream operators only process an attribute of a tuple when that attribute changes to a significant degree. These stream operators are identified. More specifically, a first stream operator that only processes an instance of a first attribute in a currently received tuple when a difference between an instance of the first attribute in a previously received tuple and the instance of the first attribute in the currently received tuple is outside of a difference threshold is identified. The "previously received tuple" may, but need not be the most recently received tuple having an instance of the first attribute. Differences between successive instances of the first attribute of tuples may be generated at a second stream operator. The generated differences may be transmitted from the second stream operator to the first stream operator in lieu of transmitting the full instances of the first attribute. In addition, before the first difference is transmitted, the first stream operator may receive and store a reference instance of the first attribute. The "reference instance" of the first attribute may be, for example, an instance created at an initial time. The first stream operator may then use one or more received differences and the stored reference instance of the first attribute to generate another instance of the attribute. This generated instance of the attribute may be the same or substantially the same as the instance of the attribute from which one of the received differences was generated.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network of networks spanning a large geographical area, such as the Internet. The links may provide different levels of bandwidth or capacity to transfer data at a particular rate. The bandwidth that a particular link provides may vary depending on numerous factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
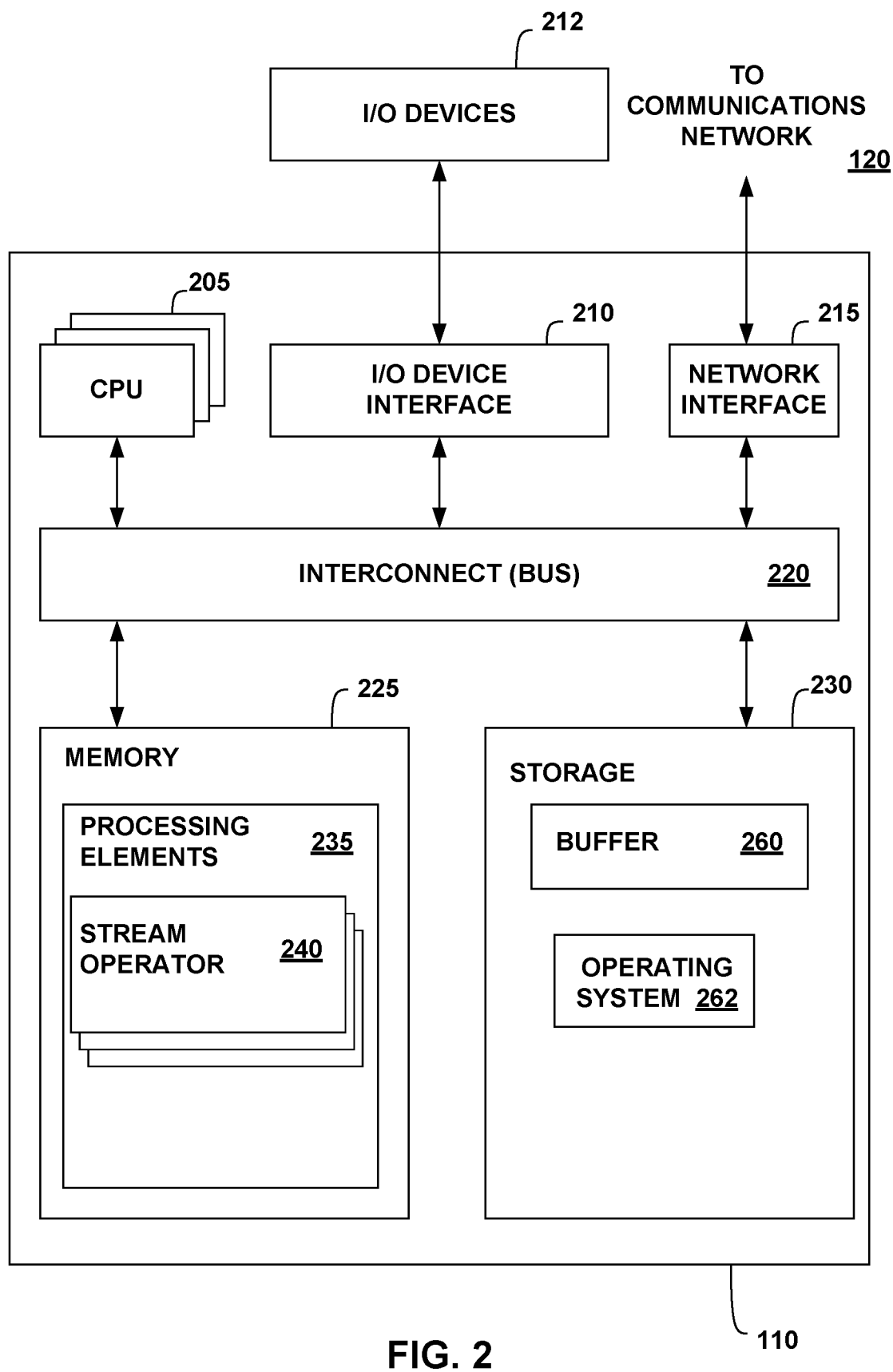
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In an embodiment, a processor 205 may be a digital signal processor (DSP). One or more processing elements 235 (described below) may be stored in the memory 225. A processing element 235 may include one or more stream operators 240 (described below). In an embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a "cloud."

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
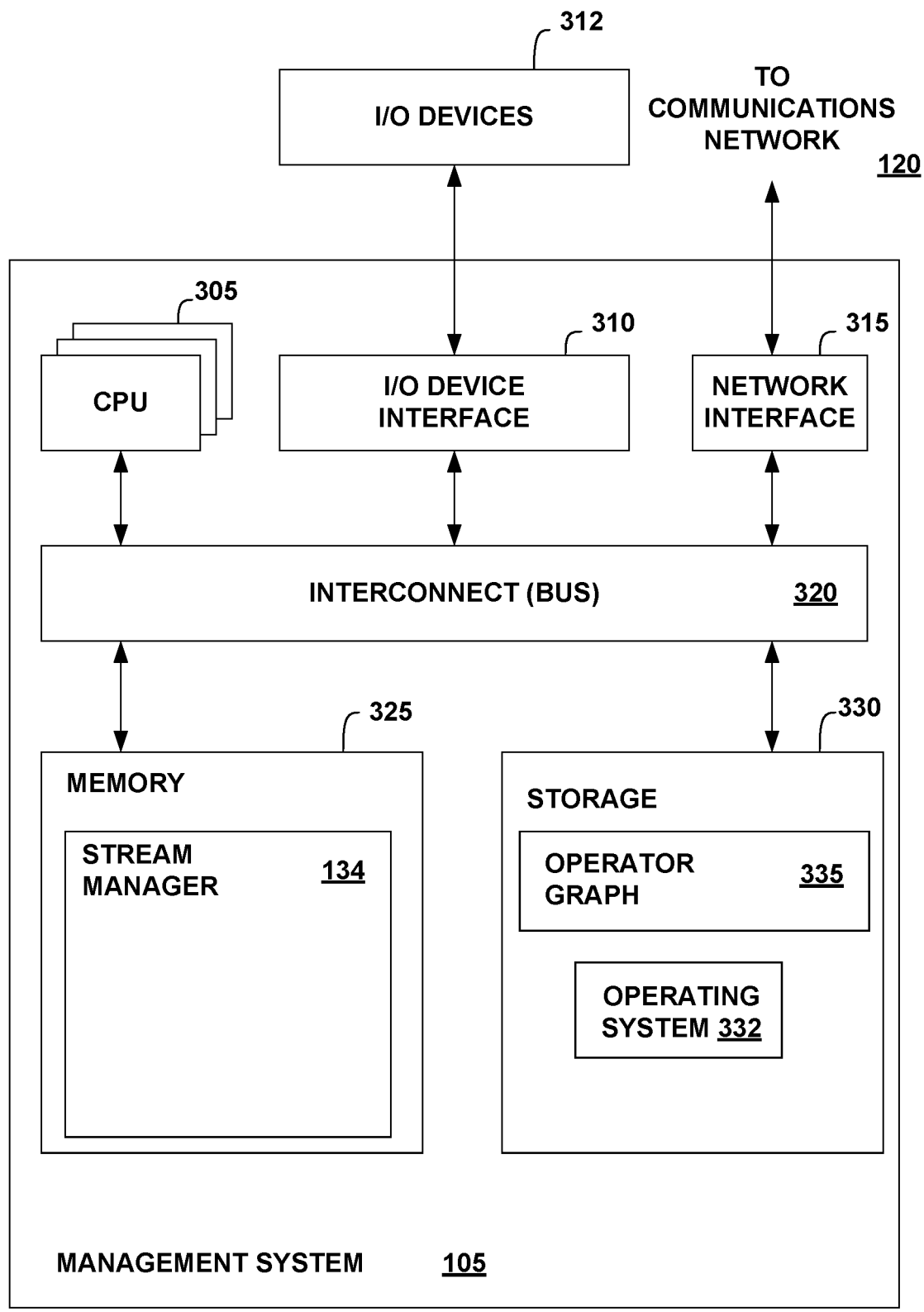
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In an embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134, which is further described below. Additionally, the memory 325 or storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
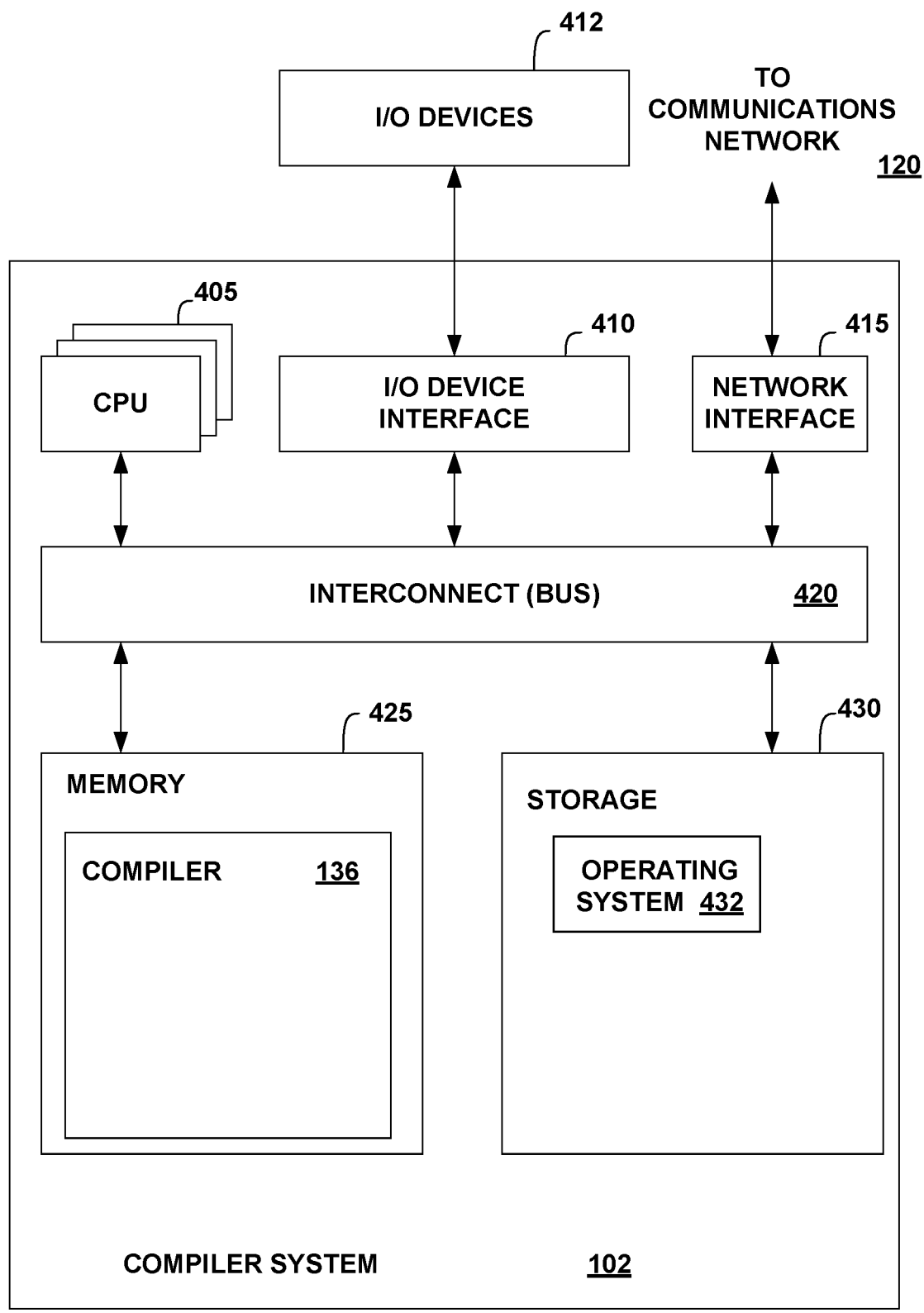
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In an embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In an embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
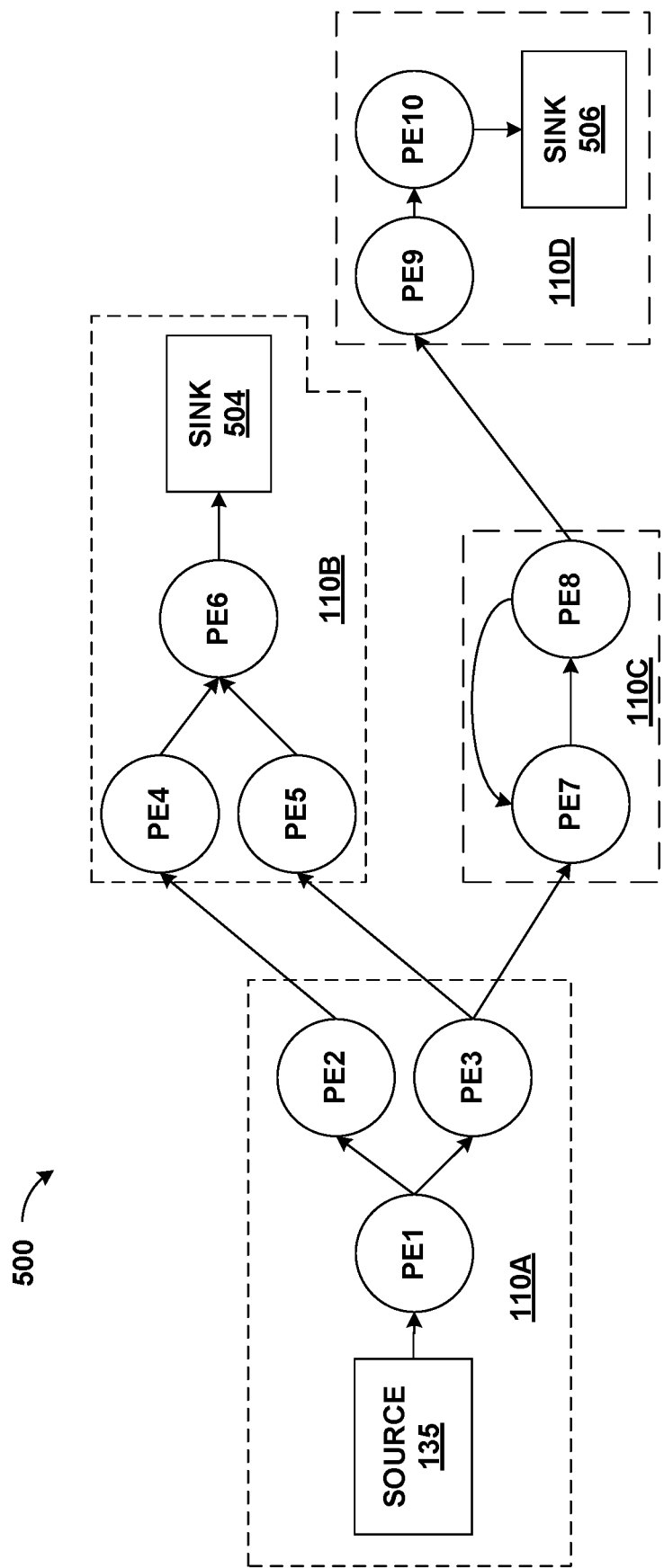
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to in this document as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, it should be appreciated that an operator graph may be much more complex and may include many individual operator graphs that may be statically or dynamically linked together.

The example operator graph 500 shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples (as new tuples) to PE2 while passing other received tuples (as new tuples) to PE3. Tuples that flow to PE2 are processed by the stream operators contained in PE2, and the resulting new tuples are then output to PE4 on compute node 110B. Likewise, the tuples output by PE4 flow to operator sink PE6 504. Similarly, tuples flowing from PE3 to PE5 also reach (as child tuples) the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples and tuple attributes in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIGS. 1 and 3 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, the stream manager 134 may control the stream computing application by inserting, removing, fusing, unfusing, or otherwise modifying the processing elements and stream operators (or what tuples flow to the processing elements) running on the compute nodes 110A-110D.

Because a processing element may be a collection of fused stream operators, it is equally correct to describe an operator graph as one or more execution paths between specific stream operators, which may include execution paths to different stream operators within the same processing element. FIG. 5 illustrates execution paths between processing elements for the sake of clarity.

In various embodiments, the stream manager 134 may be configured to identify stream operators that only process an attribute of a tuple when the difference between a previously received and a currently received instance of the attribute is outside of a difference threshold. As one example, a stream computing application may be an image processing application that includes operations for detecting and extracting features from images. The stream computing application receives a stream of tuples. Each tuple includes an attribute that is an image file generated by an image sensor in a stationary camera trained on a scene. Thus, successive tuples contain successive digital images. Because a raw image file may be 1 Mb or larger, the tuples may be large. The tuples may be passed through an operator graph with different image processing operations being performed by different processing elements and stream operators. In this example, a particular stream operator 240 performs an edge detection operation on a digital image, e.g., a stream operator in processing element PE5 in FIG. 5.

An edge detection operation identifies locations in an image where pixel values, such as brightness, are discontinuous, i.e., adjacent pixels change abruptly. An edge detection operation typically examines and compares each pixel in an image with other pixels in the same neighborhood. Once an edge detection operation has been performed on an image captured at an initial time, e.g., a reference image, the edges in the image are known. Accordingly, it may only be necessary to re-determine edges in subsequently captured images when the pixel values have changed or have changed by a significant amount. Further, it may be necessary to process only the changed pixels rather than every pixel of the subsequent image.

This image processing example illustrates one circumstance in which the stream manager 134 may be configured to identify stream operators that only process an attribute of a tuple when the difference between a previously received and a currently received instance of the attribute is outside of a difference threshold. In various embodiments, the stream manager 134 is configured to identify that a particular stream operator performs an edge detection operation. The stream manager 134 determines that the stream operator only performs the edge detection operation when the difference between a previously received and a currently received instance of an attribute is outside of (i.e., greater or less than) a difference threshold. In addition, the stream manager 134 may identify that the stream operator only processes pixels that are different from those in the first instance of the image.

In alternative embodiments, the compiler 136 may be configured to identify stream operators that only process an instance of an attribute of a tuple when the difference between a previously received and a currently received instances of the first attribute is outside of a difference threshold. In addition, the compiler 136 may identify that a stream operator only processes attribute differences.

For reference purposes, a stream operator that only processes an attribute of a tuple when the difference between a previously received and a currently received instance of the first attribute is outside of a difference threshold may be referred to as a "first" stream operator. In various embodiments, the stream manager 134 may be configured to identify a "second" stream operator 240 that transmits tuples having the first attribute to the first stream operator. For example, a stream operator in processing element PE5 (FIG. 5) may be identified as a first stream operator and a stream operator in processing element PE3 (FIG. 5) may be identified as a second stream operator. In an alternative example, a stream operator in processing element PE5 may be identified as a first stream operator and another stream operator in processing element PE5 may be identified as a second stream operator. The second stream operator may generate a difference between successive instances of the first attribute. In addition, the second stream operator may transmit a difference as a tuple attribute to the first stream operator. In an alternative, the second stream operator may transmit a difference as metadata to the first stream operator.

Figure 6:
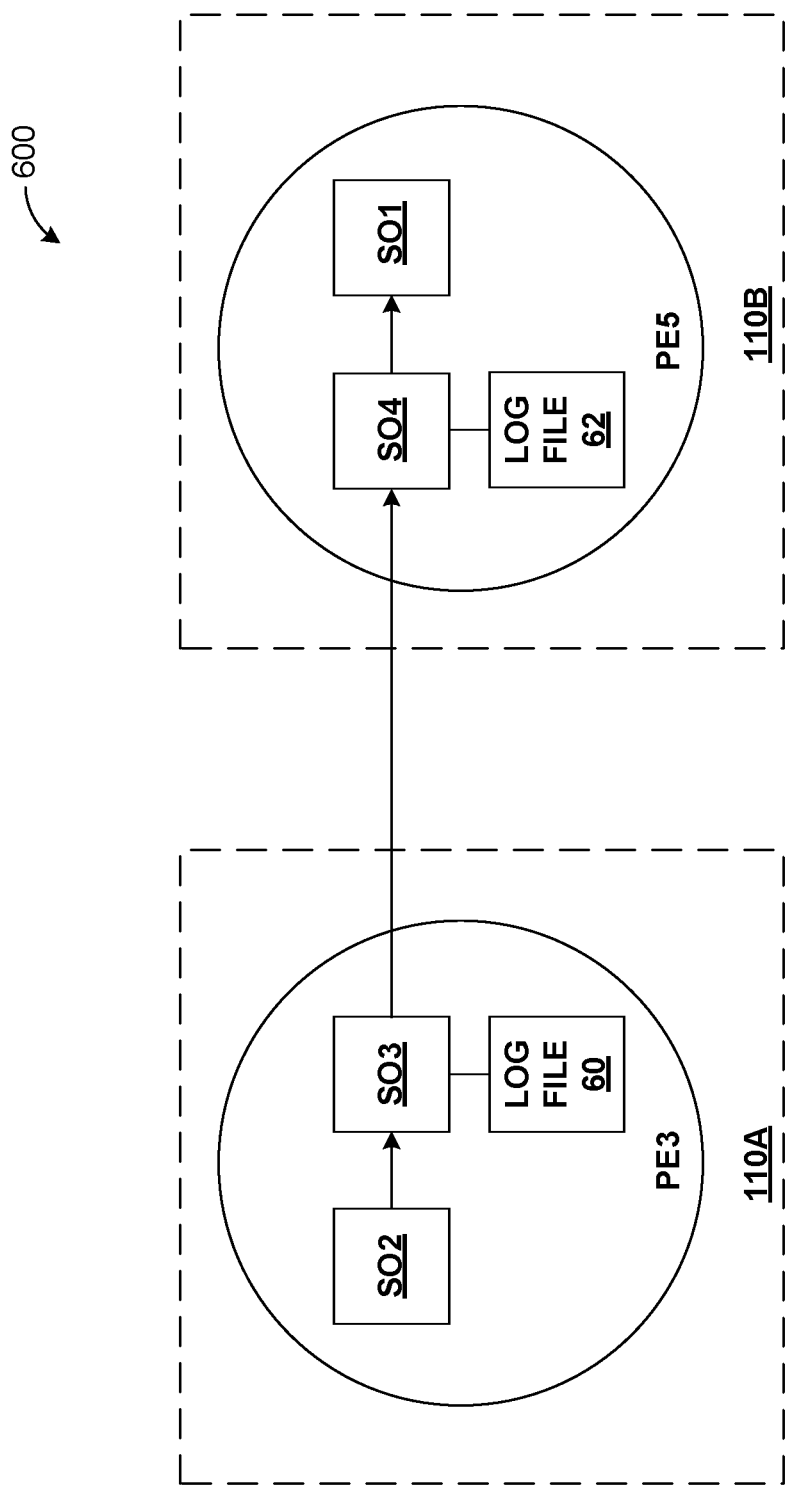
FIG. 6 illustrates a portion of the operator graph according to various embodiments.
Figure 7:
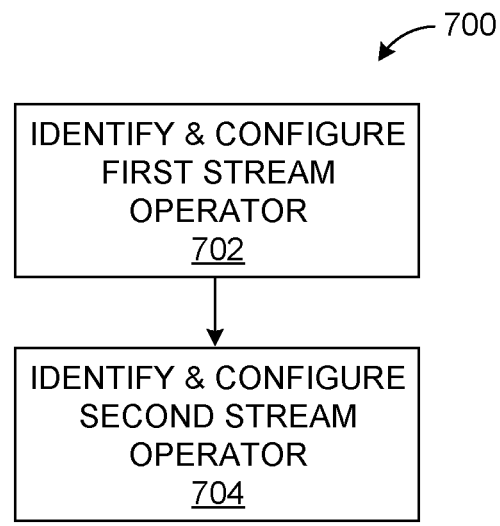
FIG. 7 illustrates a method for configuring stream operators in an operator graph according to various embodiments.

FIG. 7 illustrates a method 700 for configuring stream operators in an operator graph according to various embodiments. In operation 702, a first stream operator that only processes a first attribute of a tuple when the difference between a previously received and a currently received instance of the first attribute is outside of a difference threshold is identified. In operation 704, a second stream operator that transmits tuples having the first attribute to the first stream operator is identified. Operation 704 may include configuring the second stream operator to generate a difference between successive instances of the first attribute and transmit the difference to the first stream operator. Operation 702 may include configuring the first stream operator to receive a reference instance of the first attribute and differences. Operation 702 may also include configuring the first stream operator to generate an instance of the first attribute from the received reference instance of the first attribute and one or more of the received differences. In addition, operations 702 and 704 may include inserting stream operators into an operator graph as described below with reference to FIG. 6.

FIG. 6 illustrates a portion 600 of the operator graph 500 according to various embodiments. FIG. 6 shows stream operators that may be contained in processing elements PE3 and PE5. A first stream operator SO1 may be contained in processing element PE5 and a second stream operator SO2 may be contained in processing element PE3. The first stream operator SO1 may be identified as only processing an attribute of a tuple when the difference between a previously received and a currently received instance of the first attribute is outside of a difference threshold. The second stream operator SO2 may be identified as a stream operator that transmits tuples having the first attribute to the first stream operator. According to various embodiments, a stream operator, e.g., SO3, may be inserted into the operator graph 500 to receive output from the second stream operator SO2. The inserted stream operator SO3 may be placed in processing element PE3. In addition, a stream operator, e.g., SO4, may be inserted into the operator graph 500 to receive output from stream operator SO3. The inserted stream operator SO4 may be placed in processing element PE5. These stream operators SO3 and SO4 may be inserted into the operator graph 500 by the stream manager 134 or the compiler 136.

In operation, the stream operator SO3 may receive a tuple containing an instance the first attribute from SO2 and transmit a new tuple having an instance of the first attribute to the stream operator SO4. This instance may be designated as reference instance. In addition, the stream operator SO3 may store a copy of the reference instance of the first attribute in a log file 60. The reference instance of the first attribute may be an instance of the first attribute captured or created at an initial time. Continuing the above example, the reference instance of the first attribute may be an image file captured at an initial time. The stream operator SO3 may also transmit differences to the stream operator SO4. The stream operator SO3 may determine a difference from a first attribute that is currently received from SO2 and the copy of the reference instance of the first attribute in a log file 60. The stream operator SO3 may determine a new difference each time it receives a new tuple having an instance of the first attribute from SO2. In an embodiment, the reference instance of the first attribute in the log file 60 may be updated each time SO3 receives a tuple and differences may be determined from pre-update reference attribute instances. In an alternative embodiment, the reference instance of the first attribute in the log file 60 is not updated each time SO3 receives a tuple and differences are determined from the original reference instance of the first attribute. In this alternative, the reference instance of the first attribute in the log file 60 may be updated periodically or in response to a condition or an event. The stream operator SO3 may transmit differences between successive instances of the first attribute of tuples to the stream operator SO4. In an alternative embodiment, the stream operator SO3 may transmit a difference between a received instance of the first attribute and the reference instance of the first attribute to the stream operator SO4. In the above example where the reference attribute is an image file, a difference attribute may include an identification of which pixels are changed from a previous image file and the values of the changed pixels.

In an embodiment, the stream operator SO3 may determine whether a difference is outside of a difference threshold and only transmit to SO4 a tuple having a difference attribute when the difference is outside of the difference threshold.

Figure 8:
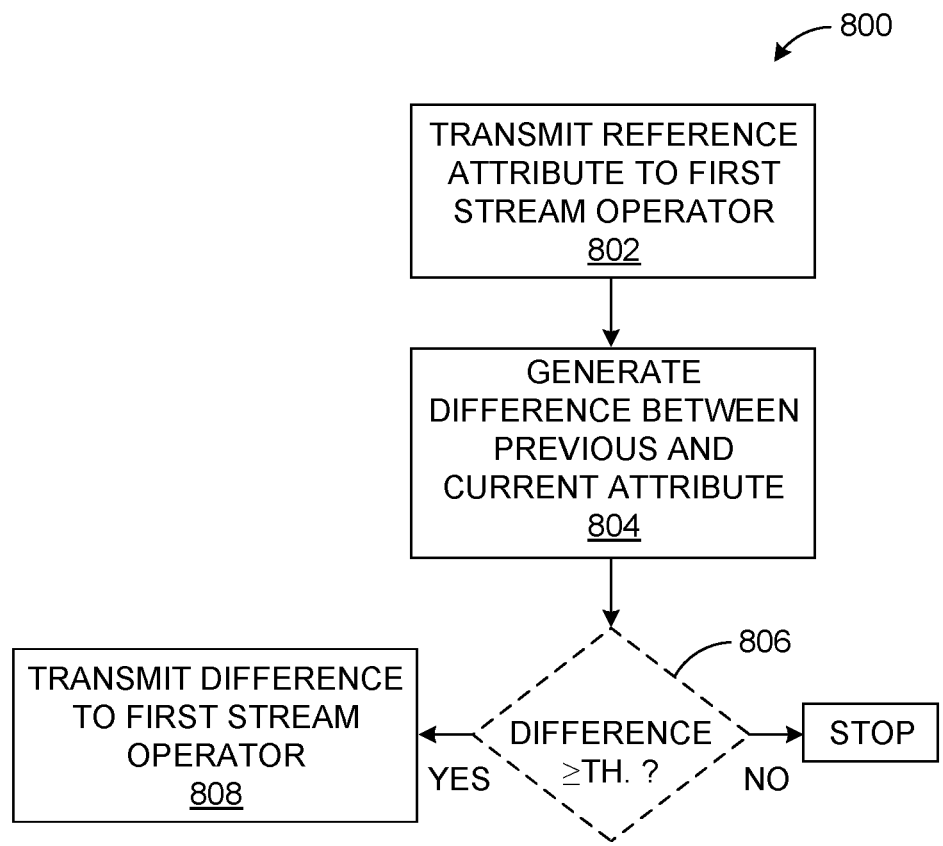
FIG. 8 illustrates a method for generating tuple difference attributes in a stream computing application according to various embodiments.

FIG. 8 illustrates a method 800 for generating difference attributes in a stream computing application according to various embodiments. In operation 802, a reference instance of the first attribute is transmitted to a first stream operator. In addition, a copy of the reference instance of the first attribute is stored in a log file 60. The reference instance of the first attribute is a full instance of the first attribute. The reference instance of the first attribute may be captured or created at an initial or selected time. In operation 804, a difference is generated from an instance of the first attribute in a currently received tuple and the copy of the reference instance of the first attribute in the log file. In optional operation 806, it is determined whether the difference is outside of a difference threshold. If optional operation 806 is included in the method 800, then in operation 808, the difference is transmitted to the first stream operator when the difference is outside of the difference threshold. Otherwise, the difference is not transmitted to the first stream operator. If optional operation 806 is not included in the method 800, the difference is transmitted to the first stream operator after operation 804.

Referring again to FIG. 6, upon receipt of tuple containing a reference instance of the first attribute, the stream operator SO4 may store the reference instance of the first attribute in a log file 62. Upon receipt of a difference, the stream operator SO4 may use the received difference and the stored reference instance of first attribute to generate another instance of the attribute. This generated instance of the first attribute may be substantially the same as the instance of the first attribute from which the received difference was generated. In an embodiment, the stream operator SO4 may update the stored reference instance of the first attribute each time a difference attribute is received. In another embodiment, the stream operator SO4 may store one or more received difference attributes in the log file 62 along with the reference instance of the attribute. The stream operator SO4 may use a received difference attribute, one or more stored difference attributes, and the stored reference instance of the first attribute to generate another instance of the first attribute. In the example above, a reference instance of an image captured at an arbitrary initial time and 120 successive difference attributes for the image may be combined to generate, i.e., reconstruct, a copy of the image captured five seconds after the reference instance was captured. In an embodiment, the stream operator SO4 may transmit a tuple having the generated instance of the first attribute to the stream operator SO1. In another embodiment, the stream operator SO4 may only transmit a tuple having the generated instance of the first attribute to the stream operator SO1 when a received difference attribute is outside of a difference threshold. In yet another embodiment, the stream operator SO4 may transmit a tuple having a received difference attribute to the stream operator SO1 when SO1 only processes differences between successive instances of the first attribute.

FIG. 9 illustrates a method 900 for receiving difference attributes in a stream computing application according to various embodiments. In operation 902, a reference instance of the first attribute is received from a second stream operator at a first stream operator. In addition, a copy of the reference instance of the first attribute is stored at the first stream operator, e.g., in the log file 62. In operation 904, a difference attribute is received from the second stream operator at the first stream operator. In optional operation 906, it may be determined whether the received difference attribute is outside of a difference threshold. In an embodiment, the operations 908 and 910 are performed when the difference attribute is outside of the difference threshold. Otherwise, the method 900 terminates. In operation 908, the received difference attribute and the stored reference instance of the first attribute are used to generate another instance of the first attribute. In operation 910, the generated instance of the first attribute, which may be the full attribute, is processed. In an alternative embodiment, the optional operation 906 is omitted and the operations 908 and 910 are performed for each received difference attribute.

FIG. 10 illustrates an alternative method 1000 for receiving tuple difference attributes in a stream computing application according to various embodiments. Operations 1002 and 1004 may be the same as operations 902 and 904. Optional operation 1006 may be the same as operation 906. Unlike the method 900, the alternative method 1000 does not include an operation in which a full instance of the first attribute is generated or reconstructed. In optional operation 1006, it may be determined whether the received difference attribute is outside of a difference threshold. In an embodiment, the difference attribute is processed (operation 1008) when the difference attribute is outside of the difference threshold. Otherwise, the method 1000 terminates. In an alternative embodiment, the optional operation 1006 is omitted and the difference attribute is processed each time a difference attribute is received.

Referring again to FIG. 6, an embodiment is shown in which the stream operator SO3 is inserted into an operator graph to determine and transmit differences. In an alternative to that shown in FIG. 6, the stream operator SO2 may be configured to perform these operations instead of stream operator SO3. Similarly, FIG. 6 illustrates an embodiment in which the stream operator SO4 is inserted into an operator graph to receive differences and a reference instance of the first attribute, and to generate new instances of the attribute. In an alternative to that shown in FIG. 6, instead of inserting the stream operator SO4, the stream operator SO1 may be configured to perform these operations.

FIG. 6 illustrates an embodiment in which a first stream operator (SO1 or SO4) and second stream operator (either SO2 or SO3) are in different processing elements on different compute nodes coupled via a single link. In an alternative embodiment, the first and second processing elements may be coupled via two or more links and one or more compute nodes. In another alternative embodiment, the first and second processing elements may be on the same compute node.

As described above with reference to FIGS. 5 and 6, a second stream operator (either SO2 or SO3) transmits a new tuple having a reference instance of the first attribute to the stream operator SO4. The reference instance of the first attribute is the entire attribute. In an embodiment, a tuple containing a reference instance of the first attribute may be transmitted periodically by a second stream operator. Alternatively, a tuple containing a reference instance of the first attribute may be transmitted by the second stream operator in response to a request. For example, the stream operator SO4 or SO1, or the stream manager 134 may request that a reference instance of the first attribute be transmitted. As another example, the stream manager 134 may insert a processing element into the operator graph 500. The operator graph 500 may be an "initial" operator graph defined at a first time and the processing element (or stream operator) is dynamically added to the operator graph at a second time subsequent to the first time. The inserted processing element may request that a reference instance of the first attribute be transmitted to it. The phrase "reference instance" is used in this Detailed Description and in the Claims for reference purposes and not to designate a single instance. In operation, there may be multiple "reference instances."

In another embodiment, a processing element (or stream operator) may be dormant for a period of time. For example, a processing element that only processes a first attribute when the difference between successive first attributes is outside of a threshold may enter a dormant mode. The processing element may enter a dormant mode under circumstances in which it does not receive attribute differences for a particular period of time. The processing element may enter a dormant mode, e.g., to conserve power. When the processing element "wakes up" and leaves the dormant mode, it may request that a reference instance of the first attribute be transmitted to it. Alternatively, when the processing element wakes up, it may simply wait for a reference instance of the first attribute be transmitted to it before it resumes processing.

An alternative embodiment may include transmitting a full attribute when the difference between successive attributes is large. A first stream operator may be identified. The first stream operator may be one that only processes an instance of a first attribute in a currently received tuple when a difference between an instance of the first attribute in a previously received tuple and the instance of the first attribute in the currently received tuple is outside of a difference threshold. In this alternative, a second stream operator may be configured to determine an estimate of resource usage required to determine a difference attribute. The difference attribute may be determined from a first instance of the first attribute in a first one of the tuples and a second instance of the first attribute in a second one of the tuples. The first and second tuples are received at the second stream operator. The second stream operator may be further configured to determine whether the estimate of resource usage is outside of a resource usage threshold. If the estimate of resource usage is outside the resource usage threshold, the second stream operator transmits the full second instance of the first attribute of the second tuple from the second stream operator to the first stream operator. This embodiment balances the amount of processing required against potential network bandwidth savings. Where resources, such as processing cycles or memory accesses, needed to determine a difference are estimated to be relatively large, the full attribute is transmitted rather than the difference. If the estimate of resource usage is within (or inside) the resource usage threshold, the difference between successive attributes may be transmitted to the first stream operator.

In the exemplary operations described above with reference to FIG. 6, a reference instance of a first attribute and difference attributes generated from successive instances of the first attribute are transmitted. In alternative embodiments, the exemplary operations described in this Detailed Description and in the Claims may be employed with two or more attributes. For example, a first attribute may be an image file and second attribute may be a numeric attribute. A first stream operator may be identified that only processes the first attribute when the difference between a previously received and a currently received instance of the first attribute is outside of a first difference threshold. Another stream operator may be identified that only processes the second attribute when the difference between a previously received and a currently received instance of the second attribute is outside of a second difference threshold. Reference instances of the first and second attributes and difference attributes generated respectively from successive instances of first and second attributes may be transmitted between appropriate stream operators.

In an embodiment, the stream manager 134 is configured to monitor a stream computing application and to determine performance metrics for the application. One performance metric the stream manager 134 may determine is the latency on a link between compute nodes. The stream manager 134 may determine that the latency of a link is such that the capacity or performance of the stream computing application is limited. If the latency of a link is outside of a latency threshold, the stream manager 134 may determine whether the size of any attributes of tuples sent over the link are above a size threshold. This size determination may be made in any suitable manner, such as calculating an average size of an attribute for a particular number of tuples. In addition, the stream manager 134 may determine for an attribute found to be over a size threshold whether the attribute does not change for a period of time, or changes slowly or by a small degree over time. In addition, the stream manager 134 may determine for an attribute found to be over the size threshold whether the attribute remains constant for a period of time or only changes in small increments. In other words, the stream manager 134 may determine whether instances of an attribute vary less than (or inside of) a variability threshold. Whether an attribute changes slowly, changes in small increments, or does not change for period of time may be determined by sampling attributes sent over the link for a particular time period. When it is determined that the latency of a link is outside of a latency threshold, an attribute of tuples transmitted over the link is over a size threshold, and instances of the attribute vary less than a variability threshold, one or more of the methods 700, 800, 900, or 1000 may be performed.

Figure 11:
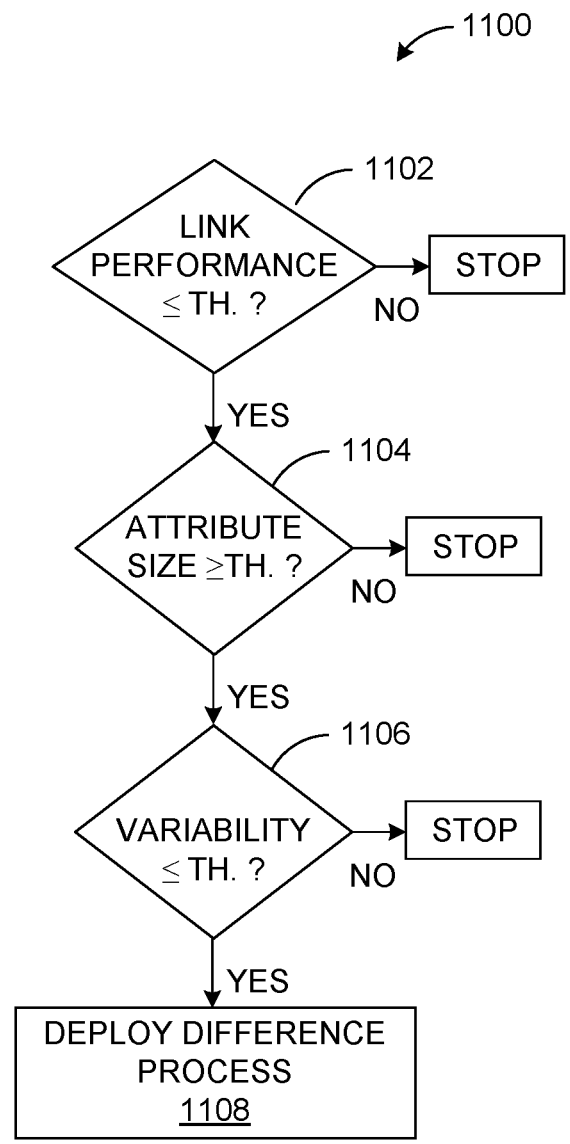
FIG. 11 illustrates a method for determining whether to deploy a tuple difference process in a stream computing application according to various embodiments.

FIG. 11 illustrates a method 1100 for determining whether to deploy one or more of the methods 700, 800, 900, or 1000 in a stream computing application according to various embodiments. In operation 1102, it is determined whether the latency of an inter-process communication path is outside of a latency threshold. One example of an inter-process communication path is the link between PE3 and PE5 (FIG. 5). If the latency is outside of the latency threshold, operation 1104 is next performed. Otherwise, the method 1100 ends. In operation 1104, it is determined whether tuples sent over a particular inter-process communication path have any attributes that are above a size threshold. One example of a size threshold is 1 Mb. If a particular number or proportion of the attributes is above the size threshold, operation 1106 is next performed. Otherwise, the method 1100 ends. In operation 1106, it is determined whether instances of the attribute over the size threshold typically vary in an amount below a variability threshold. For example, if the attribute is an image and fewer than five percent of the pixels change in successive instances of the image, the attribute may vary in amount below a variability threshold. If there is an oversized attribute below the variability threshold, operation 1108 is next performed. Otherwise, the method 1100 ends. In operation 1108, one or more of the methods 700, 800, 900, or 1000 are deployed in a stream computing application.

In another embodiment, the stream manager 134 may dynamically add a stream operator to an operator graph. The stream manager 134 adds the stream operator to the operator graph via an inter-process communication path. The stream manager 134 may perform the method 1100 to determine whether to employ one or more of the methods 700, 800, 900, or 1000 with respect to the added stream operator. The added stream operator may be identified as a first stream operator.

In various embodiments, a developer may recognize that a particular stream operator is suitable for use with one or more of the methods 700, 800, 900, or 1000. A developer may configure particular stream operators as first and second stream operators, as these terms are used in this Detailed Description and in the Claims, and deploy one or more of the methods 700, 800, 900, or 1000.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A computer program product for processing tuples on one or more computer processors, each tuple having one or more attributes, the computer program product comprising a non-transitory computer readable storage medium having program instructions embodied therewith, the program instructions executable by the one or more computer processors to cause the one or more computer processors to perform a method comprising:
  receiving at one of one or more processing elements a sequence of two or more tuples to be processed by the one or more processing elements, each processing element having one or more stream operators;
  identifying that a first stream operator only processes an instance of a first attribute in a currently received tuple when a difference between an instance of the first attribute in a previously received tuple and the instance of the first attribute in the currently received tuple is outside of a difference threshold;
  generating, at a second stream operator, a difference attribute from a first instance of the first attribute and a second instance of the first attribute; and
  transmitting the difference attribute from the second stream operator to the first stream operator.

2. The computer program product of claim 1, further comprising transmitting a reference instance of the first attribute to the first stream operator, wherein the reference instance of the first attribute is associated with an initial time.

3. The computer program product of claim 2, wherein the reference instance of the first attribute is the same as the first instance of the first attribute.

4. The computer program product of claim 2, further comprising storing the reference instance of the first attribute and generating the second instance of the first attribute at the first stream operator, the second instance of the first attribute being generated from the difference attribute and the reference instance of the first attribute.

5. The computer program product of claim 2, further comprising storing the reference instance of the first attribute at the first stream operator, determining whether the difference attribute is outside of the difference threshold, and generating the second instance of the first attribute from the difference attribute and the reference instance of the first attribute when the difference attribute is outside of the difference threshold.

6. The computer program product of claim 1, further comprising determining that an inter-process communication path is operating outside of a latency threshold.

7. The computer program product of claim 1, further comprising determining that one or more instances of the first attribute are outside of a size threshold.

8. The computer program product of claim 1, further comprising determining that one or more instances of the difference attribute are inside of a variability threshold.

9. A computer program product for processing tuples on one or more computer processors, each tuple having one or more attributes, the computer program product comprising non-transitory a computer readable storage medium having program instructions embodied therewith, the program instructions executable by the one or more computer processors to cause the one or more computer processors to perform a method comprising:
  receiving at one of one or more processing elements a sequence of two or more tuples to be processed by the one or more processing elements, each processing element having one or more stream operators;
  identifying that a first stream operator only processes an instance of a first attribute in a currently received tuple when a difference between an instance of the first attribute in a previously received tuple and the instance of the first attribute in the currently received tuple is outside of a difference threshold;
  generating, at a second stream operator, a difference attribute from a first instance of the first attribute and a second instance of the first attribute;
  determining whether the difference attribute is outside of the difference threshold; and
  transmitting the difference attribute from the second stream operator to the first stream operator when the difference attribute is outside of the difference threshold.

10. The computer program product of claim 9, further comprising transmitting a reference instance of the first attribute to the first stream operator.

11. The computer program product of claim 10, wherein the reference instance of the first attribute is transmitted to the first stream operator in response to a request from the first stream operator.

12. The computer program product of claim 10, wherein the reference instance of the first attribute is the same as the first instance of the first attribute.

13. The computer program product of claim 10, further comprising storing the reference instance of the first attribute at the first stream operator and generating the second instance of the first attribute from the difference attribute and the reference instance of the first attribute.

14. The computer program product of claim 9, wherein the one or more processing elements define an initial operator graph at a first time and the first stream operator is dynamically added to the initial operator graph at a second time subsequent to the first time.

15. The computer program product of claim 9, further comprising determining that an inter-process communication path is operating outside of a latency threshold.

16. The computer program product of claim 9, further comprising determining that one or more instances of the first attribute are outside of a size threshold.

17. The computer program product of claim 9, further comprising determining that one or more instances of the difference attribute are inside of a variability threshold.

18. A computer program product for processing tuples on one or more computer processors, each tuple having one or more attributes, the computer program product comprising a non-transitory computer readable storage medium having program instructions embodied therewith, the program instructions executable by the one or more computer processors to cause the one or more computer processors to perform a method comprising:
  receiving at one of one or more processing elements a sequence of two or more tuples to be processed by the one or more processing elements, each processing element having one or more stream operators;
  identifying that a first stream operator only processes an instance of a first attribute in a currently received tuple when a difference between an instance of the first attribute in a previously received tuple and the instance of the first attribute in the currently received tuple is outside of a difference threshold;

determining, at a second stream operator, an estimate of resource usage required to determine a difference attribute from a first instance of the first attribute in a first tuple received at the second stream operator and a second instance of the first attribute in a second tuple received at the second stream operator;

determining whether the estimate of resource usage is outside of a resource usage threshold; and transmitting one of the first instance of the first attribute of the first tuple or the second instance of the first attribute of the second tuple from the second stream operator to the first stream operator when the estimate of resource usage is outside the resource usage threshold.

19. The computer program product of claim 18, wherein when the estimate of resource usage is within the resource usage threshold, the method further comprises:

generating, at the second stream operator, the difference attribute;

determining whether the difference attribute is outside of the difference threshold; and transmitting the difference attribute from the second stream operator to the first stream operator when the difference attribute is outside of the difference threshold.

20. The computer program product of claim 18, further comprising transmitting a third instance of the first attribute to the first stream operator in response to a request from the first stream operator.

* * * * *